(12) United States Patent
Kido et al.

(10) Patent No.: US 6,403,007 B1
(45) Date of Patent: Jun. 11, 2002

(54) METHOD FOR MANUFACTURING PLATE BOEHMITE

(75) Inventors: Kenji Kido, Gifu-ken; Kaichi Fujiyoshi, Minokamo; Yasuhiro Nishigaki, Gifu-ken; Yoshio Hayashi, Gifu, all of (JP)

(73) Assignee: Kawai-Lime Ind. Co. Ltd., Gifu-Ken (JP)

( * ) Notice: Subject to any disclaimer, the term of this patent is extended or adjusted under 35 U.S.C. 154(b) by 0 days.

(21) Appl. No.: 09/396,010

(22) Filed: Sep. 15, 1999

(30) Foreign Application Priority Data

Sep. 16, 1998 (JP) .............................. 10-261425

(51) Int. Cl.[7] ............................. B29C 71/00; C01F 7/02
(52) U.S. Cl. ....................... 264/234; 264/319; 423/627; 423/629; 501/125
(58) Field of Search ................................. 264/234, 319; 501/125; 423/629, 627

(56) References Cited

U.S. PATENT DOCUMENTS 5,401,703 A * 3/1995 Fukuda ........................ 501/153

FOREIGN PATENT DOCUMENTS

| JP | 60046922 A | 3/1985 |
| JP | 60046923 A | 3/1985 |
| JP | 06-009762 | 1/1994 |
| JP | 06-329411 | 11/1994 |
| JP | 07-157639 | 6/1995 |

OTHER PUBLICATIONS

Dictionary of Ceramic Science and Engineering, O'Bannon, Plenum Press, 1984, p. 8.*

* cited by examiner

Primary Examiner—Christopher A. Fiorilla
(74) Attorney, Agent, or Firm—Vidas, Arrett & Steinkraus

(57) ABSTRACT

Method for manufacturing a plate boehmite and a plate alumina having high catalytic activity. The plate boehmite is prepared by subjecting at least one kind of an alkaline earth metal compound, which is selected from calcium, strontium and barium, and aluminum hydroxide to pressurization and heating at 150 to 300° C. in the presence of water. The resulting reaction product is treated with an acid to remove the residual alkaline earth metal compound contained in the product, followed by rinsing with water. The resulting plate boehmite is subjected to calcination at 450 to 1500° C. Thus, a plate alumina comprising a mixture of θ-alumina and δ-alumina as a major component is prepared.

16 Claims, 1 Drawing Sheet

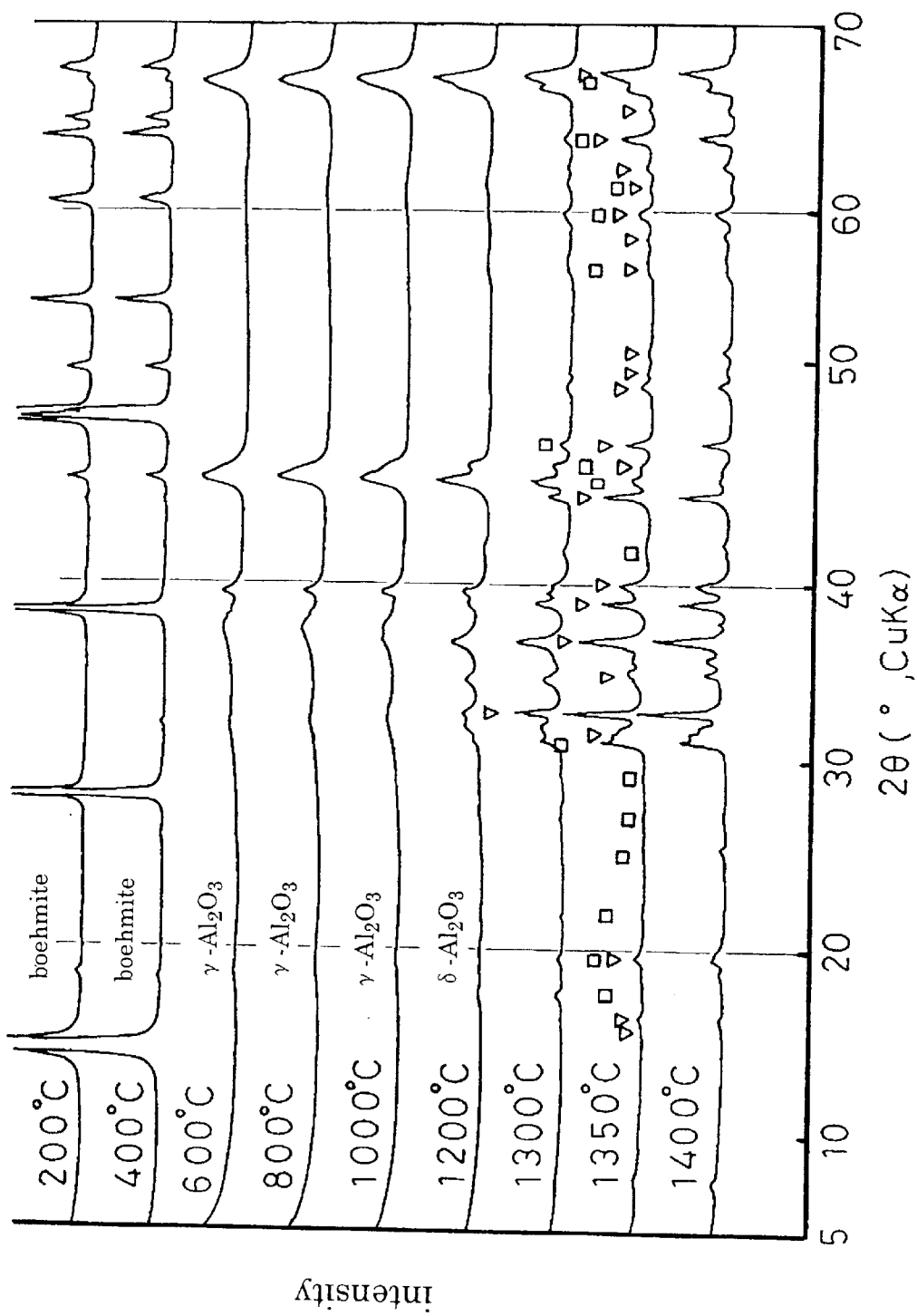

METHOD FOR MANUFACTURING PLATE BOEHMITE

BACKGROUND OF THE INVENTION

The present invention relates to plate boehmite, plate alumina and their manufacturing methods.

Boehmite and alumina are useful, for example, heat-resistant materials such as flame-retarding fillers for plastics, carriers for high-temperature catalysts, high-temperature-resistant lubricants and refractory; moisture sensors, solid electrolytes, various kinds of electronic devices, separating membranes, fluorescent materials, lubricants and coating materials. Particularly, β-alumina has found wide application for or as moisture sensors, solid electrolytes, various kinds of electronic devices, separating membranes and fluorescent materials.

Recently, gas turbine power generation resorting to high-temperature combustion is becoming the norm in the field of power generation, and the combustion temperature tends to be increasing for purposes of energy efficiency. Accordingly, high temperature catalyst carriers with high performance are in demand. Further, there is an increasing demand for solid electrolytes for sodium-sulfur (NaS) type batteries directed to storage of surplus power and gas separating membranes for effective use of various kinds of gases, and the demand for alumina materials is on the increase.

However, conventional alumina materials involve various problems. While alumina materials having various types of crystal forms have been used as combustion catalyst carriers, particulate alumina, which is used as alumina combustion catalyst carrier, has a relatively small specific surface area of less than 10 $m^2/g$. Accordingly, the alumina particles show low catalytic activity. Meanwhile, combustion in a gas turbine is carried out in a high-temperature range, for example 1200 to 1400° C. Thus, if alumina is used as a catalyst carrier, the alumina particles are caused to undergo sintering or growth by the heat of combustion in the gas turbine. As a result, the specific surface area of the alumina particles is reduced further, which makes them ineffective as a catalyst.

It is well known that alumina has various modifications. α-Alumina is most thermally stable among other modifications and can be manufactured relatively easily. However, α-alumina is a so-called corundum, so that it has a small surface area. Accordingly, α-alumina shows low catalytic function. θ-Alumina and δ-alumina, which are plate crystal forms, have relatively large surface areas, so they have high catalytic activity. However, θ-alumina and δ-alumina undergo a phase transition in high temperature conditions of 1150° C. or higher. Under such conditions, the surface areas of these alumina decrease suddenly, and the physical properties thereof are altered greatly. In the case of β-alumina containing sodium, the sodium undergoes transpiration in high temperature conditions. The transpirated sodium damages heating equipment. In addition, β-alumina cannot be manufactured easily.

The above-described shortcomings and drawbacks with respect to alumina apply also to boehmite, which is a raw material of alumina.

SUMMARY OF THE INVENTION

A first objective of the present invention is to provide a plate boehmite, which has a large specific surface area and high catalytic activity, and a method of manufacturing the plate boehmite.

A second objective of the present invention is to provide a plate alumina, which has a large specific surface area, high catalytic activity and high heat resistance, and a method for manufacturing the plate alumina.

In order to attain the above objectives, a method for manufacturing a plate boehmite is provided in a first aspect of the present invention. In this manufacturing method, raw materials including a compound containing at least one kind of alkaline earth metal selected from calcium, strontium and barium (alkaline earth metal compound); aluminum hydroxide; and water are pressurized and heated at a temperature of 150 to 300° C. The raw materials, after having undergone this pressurizing and heating step, yield a reaction product. Subsequently, the surplus alkaline earth metal compound remaining in the reaction product is removed.

A method for manufacturing a plate alumina is provided in a second aspect of the present invention. According to this manufacturing method, raw materials including a compound containing at least one kind of alkaline earth metal, which is selected from calcium, strontium and barium (alkaline earth metal compound), and aluminum hydroxide are pressurized and heated at a temperature of 150 to 300° C. in the presence of water. The raw materials, after having undergone this pressurizing and heating step, yield a plate boehmite. Subsequently, the surplus alkaline earth metal compound remaining in the plate boehmite is removed, followed by calcination of the plate boehmite at a temperature of 450 to 1500° C.

A plate boehmite having a plurality of layers is provided in a third embodiment of the present invention. This boehmite has an aspect ratio of from 10 to 35 and has at least one kind of alkaline earth metal selected from calcium, strontium and barium intercalated therein.

Features of the present invention thought to be novel will be made apparent particularly in the appended claims. The present invention as well as its object and advantages will be understood from the description of embodiments, which are preferred at present, with reference to the accompanying drawings.

BRIEF DESCRIPTION OF THE DRAWINGS

FIG. 1 is a graph showing X-ray diffraction patterns of plate alumina.

DETAILED DESCRIPTION OF THE PREFERRED EMBODIMENTS

Embodiments of the present invention will be described below in detail.

In the present invention, a plate boehmite, AlO(OH), is formed to have an aspect ratio of from 10 to 35. The plate boehmite has a specific surface area of 10 to 30 $m^2/g$. Microscopically speaking, an alkaline earth metal is chemically attached to the crystallographical face b of the boehmite. This alkaline earth metal is supposed to hinder crystal growth of boehmite in the direction of the b-axis and induces anisotropic growth in the directions of the a-axis and the c-axis, in a hydrothermal synthesis system to be described later. Further, this plate boehmite undergoes an endothermic reaction at around 500° C. and is converted to a plate alumina. The boehmite thus obtained is suitable as a flame-retarding filler for plastics. In addition, since the boehmite thus obtained has a plate form, it is suitable as a filler for reinforcing materials and a filler for braking materials.

Next, a method for manufacturing the plate boehmite will be described.

First, aluminum hydroxide, Al(OH)$_3$, is introduced together with at least one kind of an alkaline earth metal compound selected from calcium, strontium and barium to a pressure vessel such as an autoclave. It should be noted here that the alkaline earth metal compound is expressed by RX, wherein R represents Ca, Sr or Ba and X represents a negatively charged atomic group or ion to be bound with R. Next, these compounds are reacted at a high temperature and under a high pressure in the presence of water. Such a reaction is referred to as hydrothermal synthesis. The temperature used in the present invention is 150 to 300° C. In order to remove the surplus alkaline earth metal compound remaining in the resulting reaction product, the reaction product is pickled with an acid such as acetic acid and then rinsed with water to give a plate boehmite.

During the hydrothermal synthesis reaction, it is preferred that the reaction raw materials in the autoclave are not stirred but are left to stand or are stirred at a low speed. The boehmite can be controlled to have a plate shape by controlling the stirring step.

Meanwhile, the hydrothermal reaction may be carried out with the reaction raw materials being charged in a container having a predetermined shape such as that of a honeycomb structure, and the resulting reaction product may be placed, for example, on a support and subjected to calcination so that the product maintains its shape. Alternatively, the product obtained after the hydrothermal reaction may be packed in a container having a predetermined shape such as that of a honeycomb structure and, after removal of the reaction product, which is molded into the predetermined shape of the container, it may be subjected to calcination. According to the process as described above, alumina blocks having a predetermined shape can be manufactured.

Alkaline earth metal compounds usable as one of the reaction raw materials here include hydroxides, oxides, chlorides, carbonates, sulfates, nitrates and phosphates of alkaline earth metals including calcium, strontium or barium. Also, organic acid salts including acetates and formates of such alkaline earth metals are acceptable compounds. Further, the alkaline earth metal compound may be a hydrate of such compounds, for example, barium hydroxide·8hydrate, or Ba(OH)$_2$·8H$_2$O. In addition, these alkaline earth metal compounds may be used alone or in combination. For example, when one kind of alkaline earth metal compound is used, a plate boehmite and a plate alumina having a regular hexagonal or oblong hexagonal shape can be obtained.

As the aluminum hydroxide, that are waste by-products of a process for making anodized aluminum and the like may be used. Further, water is essential as a reaction raw material. Aqueous solutions of compounds generally referred to as "acids" including dilute hydrochloric acid, nitric acid and acetic acid can be nonlimitatively used for the pickling treatment.

In addition to the above reaction raw materials, additives may also be used. Such additives include sodium compounds, alcohols and amines, preferably alcohols and amines. These additives may be used alone or in combination. When a sodium compound is used, that alkalinity in the reaction raw materials can be adjusted depending on the amount of the sodium compound added, so that solubility of aluminum hydroxide can be adjusted. Thus, hydrothermal synthesis is accelerated. Further, when an alcohol is used, the alcohol prevents the reaction product from a growing into large particles while yielding a reaction product having a large specific surface area. The amines accelerate hydrothermal synthesis of the reaction raw materials and prevent the reaction product from growing into large particles while increasing the specific surface area of the reaction product.

Acceptable sodium compounds include, for example, sodium hydroxide (NaOH), sodium acetate (CH$_3$COONa) and sodium chloride (NaCl). Sodium hydroxide is particularly preferred. These sodium compounds may be used alone or in combination.

Acceptable alcohols include, for example, monohydric alcohols such as methanol (CH$_3$OH) and ethanol (CH$_3$CH$_2$OH) and polyhydric alcohols such as ethylene glycol (HOCH$_2$CH$_2$OH), diethylene glycol [HO(CH$_2$)$_2$O(CH$_2$)$_2$OH] and glycerol (C$_3$H$_8$O$_3$). Ethylene glycol and glycerol are particularly preferred. These alcohols may be used alone or in combination.

Acceptable amines include, for example, triethanolamine [N(CH$_2$CH$_2$OH)$_3$], methylamine (CH$_3$NH$_2$), diacylamine [(RCO)$_2$NH], triacylamine [(RCO)$_3$N], cyclohexylamine [C$_6$H$_{11}$NH$_2$], hexamethylenetetramine (C$_3$H$_{12}$N$_4$), N-ethylaniline ((C$_6$H$_5$NHC$_2$H$_5$) and ethylenediaminetetraacetic acid (EDTA). Triethanolamine is particularly preferred. It should be noted here that the R's in the above chemical formulae represent alkyl groups respectively. These amines may be used alone or in combination.

The mixing molar ratio of at least one kind of compound selected from the alkaline earth metal compounds to aluminum hydroxide is preferably 1:6 to 1:18, more preferably 1:6 to 1:14, and still more preferably, 1:8 to 1:12. By setting the molar ratio within the range as specified above, plate boehmite can be manufactured efficiently.

The weight of water used is preferably two to twenty-four times, more preferably three to ten times, the weight of aluminum hydroxide. If the weight of water is less than twice that of the aluminum hydroxide, there is not enough water for hydrothermal synthesis of the reaction raw materials. Meanwhile, if the weight of water is more than twenty-four times that of the aluminum hydroxide, the amount of wasted water is increased, leading to high manufacturing cost and low plate boehmite productivity.

The amount of sodium compound used is preferably in the amount of 0.05 to 10 wt %, more preferably, 0.1 to 5 wt % of the aluminum hydroxide. If the sodium compound is used within the above range, it exhibits adequate acceleration of the hydrothermal synthesis between the reaction raw materials and the water. The amount of alcohol used is preferably in the amount of 10 to 60 wt %, more preferably, 15 to 40 wt %, of the total amount of the water. The above range is preferred because the reaction product can be prevented from growing into large particles which still having large specific surface areas.

The amount of amine used is preferably in the amount of 1 to 50 wt %, more preferably, 5 to 30 wt % of the total weight of the water. The above range is preferred for balancing acceleration of the hydrothermal synthesis of the reaction raw materials with restriction of the particle size while still forming plates to increase the specific surface area of the reaction product.

When the raw materials are to be stirred during the reaction, they are preferably stirred at a rate of 150 rpm or less. More preferably, the reaction raw materials are not stirred but are left to stand. If the reaction is carried out with stirring at a rate of 150 rpm or less, the reaction can be homogenized, and the reaction efficiency can be improved. If the reaction is carried out while the raw materials are still (without stirring), the reaction product is not in the form of large particles but in the form of plates.

The temperature in the autoclave is preferably 150 to 300° C., more preferably, 170 to 220° C. If the temperature is lower than 150° C., it is difficult to obtain the reaction product. If this temperature is higher than 300° C., productivity is lowered, and the manufacturing cost is increased.

The period of heating in the autoclave is preferably 4 to 48 hours, more preferably 10 to 24 hours. The heating period is changed depending on whether the reaction is carried out with or without stirring and on the reaction temperature. A heating period of less than four hours cannot achieve sufficient control of the shape of the reaction product; whereas a heating period of more than 48 hours increases the manufacturing costs including the energy costs.

The plate boehmite obtained through the above process has at least one kind of alkaline earth metal selected from calcium, strontium and barium being intercalated therein, usually in the form of an ion. The amount of the alkaline earth metal ion intercalated in the plate boehmite is about 5% based on the total amount of alkaline earth metal contained in the alkaline earth metal compound used as a raw material. Here, "intercalation" refers to a state where molecules, atoms or ions are interposed between layers of a substance having a layer structure.

Next, plate alumina ($Al_2O_3$) contains as a major component a mixture of $\theta$-alumina and $\delta$-alumina to which a trace of alkaline earth metal is intercalated. Accordingly, the plate alumina is stable even at 1350° C., and its crystal form and specific surface area are maintained for an extended period. That is, the plate alumina is a material suitably used as a high-temperature catalyst carrier, a high-temperature-resistant lubricant and refractory. Particularly, the plate alumina can be used as a stable high-temperature catalyst carrier over an extended period under high-temperature conditions. This plate alumina can be obtained by calcination of the above plate boehmite. The plate alumina obtained after calcination has the same shape as that of the plate boehmite and retains the plate form. Further, the aspect ratio of the thus obtained plate alumina is from 10 to 35, and the specific surface area thereof is 10 to 30 $m^2/g$. The dimensions of plate alumina products are substantially uniform. Accordingly, if the plate alumina products are used as high-temperature catalyst carrier, pressure loss can be reduced, and efficient catalytic activity is exhibited. Therefore, the plate alumina is suitable as a catalyst carrier.

Next, the method for manufacturing the plate alumina will be described.

Plate alumina can be manufactured by calcination of the above plate boehmite, for example, in an electric oven at a temperature of 450 to 1500° C. The calcination temperature is preferably 450 to 1500° C., more preferably, 1100 to 1400° C. If the calcination temperature is lower than 450° C., the boehmite cannot be calcined. Meanwhile, if the calcination temperature is higher than 1500° C., the manufacturing costs, including the energy costs, increase. In addition, the plate alumina is sintered, or grows into granules, which unfavorably reduces the specific surface area.

The calcination period is preferably 1 to 4 hours, more preferably, 1.5 to 3.5 hours. If the calcination period is less than 1 hour, calcination is insufficient, making it difficult to obtain plate alumina. Meanwhile, if the calcination period is more than 4 hours, the manufacturing costs including the energy costs increase.

As described above, this embodiment has the following effects.

The plate boehmite and the plate alumina in this embodiment have aspect ratios of from 10 to 35. Accordingly, they have large specific surface areas and improved activities.

While an ordinary boehmite undergoes an endothermic reaction at 550° C. when being converted into an alumina, the plate boehmite of this embodiment undergoes an endothermic reaction at a lower temperature of about 490° C. Since flame-retardants are usually required to undergo endothermic reactions in the temperature range of 300 to 500° C., this plate boehmite is suitable as a flame-retarding filler for plastics and is also suitable as a reinforcing material.

Further, the resulting plate boehmite is suitable as a filler for braking materials.

According to the method for manufacturing a plate boehmite of this embodiment, the reaction raw materials are subjected to a hydrothermal synthetic reaction, and the resulting product is treated with acid and rinsed with water. Thus, a highly active plate boehmite having a great specific surface area can be manufactured efficiently.

The plate alumina of this embodiment contains, as a major component, a mixture of $\theta$-alumina and $\delta$-alumina. Accordingly, the plate alumina has a large specific surface area and improved activity. Further, the plate alumina has high heat resistance. Accordingly, the plate alumina is stable when used under high-temperature conditions over an extended period.

According to the method for manufacturing a plate alumina of this embodiment, a highly active plate alumina having a large specific surface area can be manufactured efficiently by subjecting the plate boehmite to calcination. Further, a plate alumina that is highly heat resistant and stable at a high temperature over an extended period can be manufactured easily.

According to the methods for manufacturing a plate boehmite and a plate alumina of this embodiment, an aluminum hydroxide that is a waste by-product can be used as the aluminum hydroxide. Thus, such aluminum hydroxide can be effectively used as the reaction raw material, and problems of environmental pollution caused by such waste by-product can be solved.

In the methods for manufacturing a plate boehmite and a plate alumina according to this embodiment, the use of one kind of alkaline earth metal compound can give a plate boehmite and a plate alumina, which have a regular or oblong hexagonal shape.

EXAMPLES

Examples based on the above embodiment will be described below.

In Example 1, 337 g of barium hydroxide·8 hydrate, 1000 g of aluminum hydroxide and 5,000 g of water were weighed. The weighed raw materials were mixed in an autoclave. Then, the internal pressure of the autoclave was increased, and the mixture was heated to 200° C. at a heating rate of 200° C./hour. The mixture was maintained under the same conditions for twelve hours to effect a hydrothermal reaction. In Example 1, the mixture was not stirred but was left to stand.

Subsequently, after the reacted mixture was left to cool, the mixture was filtered to obtain a reaction product. The reaction product was subjected to a pickling treatment and then rinsed with water. This was followed by drying of the reaction product at 105° C. Thus, a plate boehmite was obtained. Further, the plate boehmite was heated at a rate of 100° C./hour and calcined at 1350° C. for 3 hours to obtain a plate alumina. In Example 1, the molar ratio of the alkaline earth metal compound (barium hydroxide) to aluminum hydroxide was 8.3:100.

In the following Examples 2 to 20, the procedures in Example 1 were repeated analogously with some exceptions which will mainly be described below.

In Example 2, 225 g of barium hydroxide·8hydrate was used.

In Example 3, 393 g of barium hydroxide·8hydrate was used.

In Example 4, 2,000 g of water was used.

In Example 5, 20,000 g of water was used.

In Example 6, the mixture was heated at 150° C.

In Example 7, the mixture was heated at 170° C.

In Example 8, the mixture was heated for a period of 24 hours.

In Example 9, the plate boehmite was calcined at 1000° C.

In Example 10, the plate boehmite was calcined at 1500° C.

In Example 11, the mixture was heated with stirring at 150 rpm.

In Example 12, 30 g of sodium hydroxide was admixed with the mixture, and the heating temperature of the resulting mixture was changed to 170° C.

In Example 13, the procedures of Example 12 were repeated analogously except that the sodium hydroxide was replaced with 30 g of sodium chloride.

In Example 14, the procedures of Example 11 were repeated analogously, except that 100 g of triethanolamine was further added to the mixture in the autoclave and that the temperature of heating the resulting mixture was changed to 170° C.

In Example 15, the procedures of Example 14 were repeated analogously, except that 100 g of triethanolamine used in Example 14 was replaced with 250 g of glycerol.

In Example 16, the procedures of Example 1 were repeated analogously except that 337 g of barium hydroxide was replaced with 562 g of barium acetate and the temperature of heating the resulting mixture was changed to 170° C.

In Example 17, the procedures of Example 16 were repeated analogously except that the 562 g of barium acetate used in Example 16 was replaced with 79 g of calcium hydroxide.

In Example 18, the procedures of Example 16 were repeated analogously except that the 562 g of barium acetate used in Example 16 was replaced with 55 g of calcium hydroxide and 44 g of calcium sulfate.

In Example 19, the procedures of Example 16 were repeated analogously except that the 562 g of barium acetate used in Example 16 was replaced with 75 g of calcium hydroxide and 6 g of calcium chloride.

In Example 20, the procedures of Example 16 were repeated analogously except that the 562 g of barium acetate used in Example 16 was replaced with 283 g of strontium hydroxide·8hydrate.

The physical properties of the plate boehmite and plate alumina products obtained in Examples 1 to 20 were tested. The results are as shown in Table 1, in which the unit for the major diameter is μm and that for the specific surface area is m²/g. As the results in Table 1 show, the plate boehmite and plate alumina products obtained in Examples 1 to 20 had aspect ratios of from 10 to 35 and specific surface areas of 10 to 30 m²/g. These values are greater than those in the prior art products. Further, these plate boehmite products had no problems when they were used as flame-retarding fillers for plastics. Therefore, the plate boehmite products were suitable as flame-retarding fillers for plastics. In addition, since the plate alumina products retained the properties of the starting material plate boehmite products, they were suitable as a high-temperature catalyst carrier.

Crystal faces of the plate boehmite obtained in Example 16 were determined using an X-ray diffractometer. Table 2 shows the relative intensity ratio of the diffracted X-rays on each crystal face of the plate boehmite. The values of Control Example 1 were extracted from those of general boehmite described in "Joint Committee on Powder Diffraction Standards" which is a data book of known substances. The relative intensity ratio means the height of each diffracted X-ray, provided that the height of the diffracted X-ray having the maximum intensity is 100. Incidentally, (020), (200) and (002) refer to crystal faces expressed by the crystal indices.

As shown in Table 2, the relative intensity ratio at face (020) was great in the plate boehmite of Example 16 compared with the general boehmite of Control Example 1, whereas those at faces (200) and (002) were small compared with those of Control Example 1. This result shows that atoms are present in a larger amount on face (020) than on faces (200) and (002). It can be understood from this result that this plate boehmite has a plate form obtained by anisotropic growth on face (020).

Example 21

In Example 21, plate boehmite products obtained in the same manner as in Example 16 were calcined at various temperatures. The calcination temperatures were 200° C., 400° C., 600° C., 800° C., 1000° C., 1200° C., 1300° C., 1350° C. and 1400° C. The plate boehmite products were calcined at the above temperatures respectively for one hour. An X-ray diffraction pattern obtained for each of the resulting plate alumina products was determined using an X-ray diffractometer. The crystal structure of each plate alumina product was analyzed based on the results of the determination. The results are shown in FIG. 1.

The abscissa in FIG. 1 represents angles of diffraction (2θ) of the diffracted X-rays, and the ordinate represents intensity of the diffracted X-rays. The mark ∇ in FIG. 1 indicates peaks characteristic to θ-alumina; whereas the mark □ indicates peaks characteristic to δ-alumina. It was found from FIG. 1 that when the calcination temperature is 400° C. or lower, the plate boehmite remains as such even after calcination to form no plate alumina. It was also found that when the calcination temperature is 600° C. to 1000° C., plate alumina products containing γ-alumina as a major component are formed. Meanwhile, it was found that when the calcination temperature is 1200° C. to 1400° C., plate alumina products, each containing a mixture of θ-alumina and δ-alumina as a major component are formed. The ratio of θ-alumina to δ-alumina in the mixtures formed varies between 0:100 and 100:0 depending on the calcination temperature. For example, when calcination is carried out at 1300 to 1350° C., the ratio of θ-alumina to δ-alumina becomes about 50:50. As described above, the composition of the plate alumina product to be obtained can be controlled by adjusting the calcination temperature.

While embodiments and examples of the present invention have been described with reference to the drawing and tables, the present invention is not to be limited to the details given herein, but may be modified within the scope of the appended claims and its equivalence.

TABLE 1

| Example No. | Major diameter | Aspect ratio | Specific surface area |
| --- | --- | --- | --- |
| 1 | 3 | 18 | 14.8 |
| 2 | 2 | 10 | 13.3 |
| 3 | 3 | 19 | 15.6 |
| 4 | 2 | 12 | 15.6 |
| 5 | 4 | 22 | 13.3 |
| 6 | 4 | 16 | 12.8 |
| 7 | 4 | 19 | 14.4 |
| 8 | 4.5 | 25 | 13.3 |
| 9 | 3 | 18 | 14.8 |
| 10 | 3 | 18 | 13.9 |
| 11 | 2 | 19 | 23.3 |
| 12 | 7 | 32 | 10.8 |
| 13 | 6 | 27 | 10.7 |
| 14 | 2 | 17 | 25.6 |
| 15 | 1.5 | 13 | 20.1 |
| 16 | 2 | 17 | 21.1 |
| 17 | 5 | 25 | 12.0 |
| 18 | 4 | 16 | 10.0 |
| 19 | 3 | 11 | 10.0 |
| 20 | 4 | 23 | 13.9 |

TABLE 2

|  | (020) | (200) | (002) |
| --- | --- | --- | --- |
| Example 16 | 100 | 10 | 2 |
| Comp. Ex. 1 | 100 | 25 | 10 |

What is claimed is:

1. A method for manufacturing a plate boehmite, the method comprising:

pressurizing raw materials including:
an alkaline earth metal compound containing at least one kind of alkaline earth metal selected from the group consisting of calcium, strontium and barium;
aluminum hydroxide; and
water;

heating the raw materials at a temperature of 150 to 300° C., wherein a reaction product including the plate boehmite is formed from the raw materials by this pressurizing and heating step; and removing a surplus alkaline earth metal compound remaining in the reaction product, wherein the step of removing the surplus alkaline earth metal compound comprises:
treating the reaction product with an acid; and
rinsing the thus created reaction product with water.

2. The manufacturing method according to claim 1, wherein the plate boehmite has a plurality of layers, and ions of the alkaline earth metal are intercalated between these layers by the reaction.

3. The manufacturing method according to claim 1, wherein alkaline earth metal compound is at least one kind selected from hydroxides, oxides, chlorides, sulfates and organic acid salts.

4. The manufacturing method according to claim 3, wherein the alkaline earth metal compound is an acetate.

5. The manufacturing method according to claim 3, wherein only one kind of alkaline earth metal compound is used as the alkaline earth metal compound.

6. A method for manufacturing a plate boehmite, the method comprising:

pressurizing raw materials including:
an alkaline earth metal compound containing at least one kind of alkaline earth metal selected from the group consisting of calcium, strontium and barium;
aluminum hydroxide; and
water, wherein the raw material further contains as an additive a sodium compound, an alcohol or an amine;

heating the raw materials at a temperature of 150 to 300° C., wherein a reaction product including the plate boehmite is formed from the raw materials by this pressurizing and heating step; and removing surplus alkaline earth metal compound remaining in the reaction product, the raw material further contains as an additive a sodium compound, an alcohol or an amine.

7. A method for manufacturing a plate alumina, the method comprising:

pressurizing raw materials including:
an alkaline earth metal compound containing at least one kind of alkaline earth metal selected from the group consisting of calcium, strontium and barium;
aluminum hydroxide; and
water;

heating the raw materials at a temperature of 150 to 300° C. under pressure, the raw materials being reacted by the heating step to form a plate boehmite, a surplus alkaline earth metal compound being formed with the plate boehmite;

removing the surplus alkaline earth metal conpound from the plate boehmite; and subjecting the plate boehmite to calcination at a temperature of 450 to 1500° C., wherein the raw material further contains as an additive an alcohol or an amine.

8. The manufacturing method according to claim 7 further comprising molding the plate boehmite into a predetermined shape.

9. The manufacturing method according to claim 8, wherein the molding step includes packing the boehmite product into a container having a predetermined shape, followed by calcination.

10. The manufacturing method according to claim 8, wherein the molding step is achieved by carrying out the reaction with the raw materials packed in a container having a predetermined shape.

11. The manufacturing method according to claim 7, wherein the alkaline earth metal compound is at least one kind selected from hydroxides, oxides, chlorides, sulfates and organic acid salts.

12. The manufacturing method according to claim 7, wherein the plate boehmite has a plate form and also has a plurality of layers, and ions of the alkaline earth metal are intercalated between these layers by the reaction.

13. The manufacturing method according to claim 7, wherein only one kind of alkaline earth metal compound is used as the alkaline earth metal compound.

14. The manufacturing method according to claim 7, wherein the composition of the plate boehmite can be changed by adjusting the temperature in the calcination step.

15. The manufacturing method according to claim 14, wherein the temperature in the calcination step is set to 500 to 1000° C. to give a plate alumina product containing γ-alumina as a major component.

16. The manufacturing method according to claim 14, wherein the temperature in the calcination step is set to 1200 to 1400° C. to give a plate alumina product containing a mixture of θ-alumina and δ-alumina as a major component.

* * * * *